H. N. OTT.
ADJUSTMENT MECHANISM FOR MICROSCOPES.
APPLICATION FILED JULY 12, 1915.
1,223,198. Patented Apr. 17, 1917.
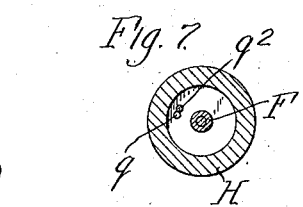
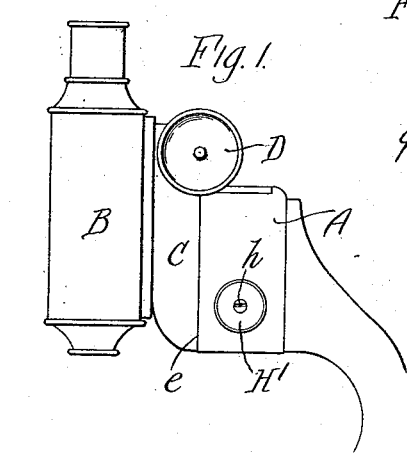
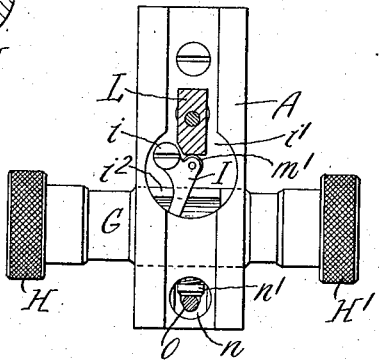
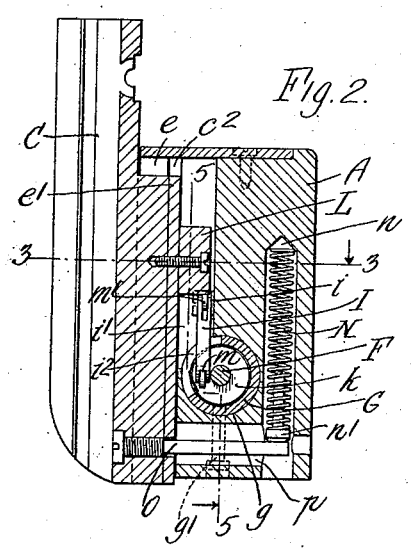
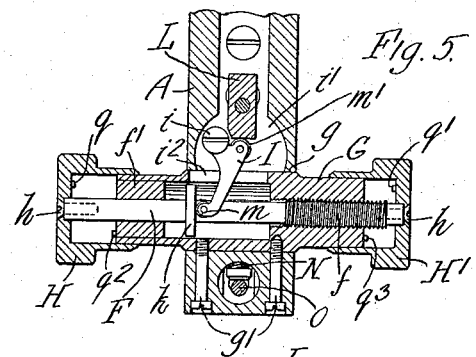
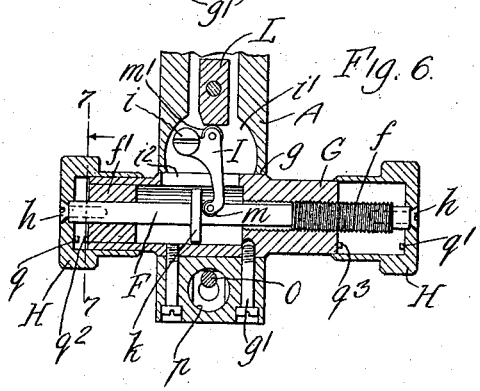
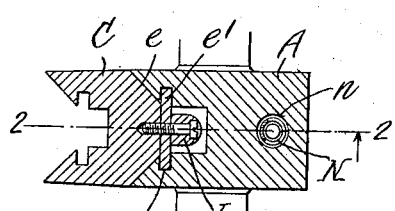
Inventor.
Harvey N. Ott,
by Wilhelm & Parker
Attorneys.

UNITED STATES PATENT OFFICE.

HARVEY N. OTT, OF BUFFALO, NEW YORK, ASSIGNOR TO SPENCER LENS COMPANY, OF BUFFALO, NEW YORK.

ADJUSTMENT MECHANISM FOR MICROSCOPES.

1,223,198.      Specification of Letters Patent.      Patented Apr. 17, 1917.

Application filed July 12, 1915. Serial No. 39,226.

*To all whom it may concern:*

Be it known that I, HARVEY N. OTT, a citizen of the United States, residing at Buffalo, in the county of Erie and State of New York, have invented a new and useful Improvement in Adjustment Mechanisms for Microscopes, of which the following is a specification.

This invention relates to adjustment mechanisms for microscopes, and particularly to improvements in fine adjustment mechanisms in which the adjustment is effected by means of a screw shaft which extends horizontally transversely of the instrument and is operatively connected to the body tube, tube slide or other member to be adjusted by an intermediate lever or device actuated by said shaft.

The objects of the invention are to improve and simplify fine adjustment mechanisms of this sort, and particularly to provide such a mechanism in which the screw operating shaft moves endwise in its bearings and is in direct operative connection with the motion transmitting lever or device between the screw shaft and the part to be adjusted so as thereby to decrease lost motion and reduce the number of parts to the minimum; also to provide an adjusting mechanism in which the adjusting shaft has bearings at opposite sides of the stand in a single-piece bearing sleeve mounted on the stand; and also to provide stop means of simple and efficient construction which operate to positively arrest the rotation of the adjusting shaft at the desired limit of its travel and prevent the screw-thread of the shaft from being jammed or injured.

In the accompanying drawings:

Figure 1 is a fragmentary side elevation of the supporting arm and body tube of a microscope provided with fine adjustment mechanism embodying the invention.

Fig. 2 is a longitudinal sectional elevation thereof on an enlarged scale in line 2—2, Fig. 3.

Fig. 3 is a horizontal section thereof in line 3—3, Fig. 2.

Fig. 4 is a front elevation of the supporting arm showing in section parts which project into the same from the tube slide, which is removed.

Fig. 5 is a transverse sectional elevation in line 5—5, Fig. 2.

Fig. 6 is a similar view showing a different position of the parts.

Fig. 7 is a section in line 7—7, Fig. 6, but showing the parts in the position in which the stops engage.

Fig. 8 is a detached side elevation of the bearing sleeve and the adjusting shaft therein.

A represents the supporting arm, B the body tube, and C the tube slide of a microscope, which, with the exception of the fine adjustment mechanism hereinafter described, may be of any usual or suitable construction. In the construction shown, which is common, the body tube is adjustable vertically on the tube slide C and is adapted to be adjusted thereon by a coarse adjusting mechanism of which the operating knob is shown at D, Fig. 1, while the tube slide C is adjustable vertically on the supporting arm, and is adjusted thereon by the fine adjusting mechanism constituting the subject-matter of this invention. The fine adjustment mechanism could, however, be utilized for adjusting a part other than the tube slide. The tube slide shown is provided with a beveled rear side seated and adapted to slide in a guideway *e* in the front of the supporting arm in which it is retained by a bar *e'* secured on the rear face of the slide with its edges extending into vertical grooves *c²* in the supporting arm.

F represents the operating shaft of the fine adjustment. This shaft is preferably arranged horizontally transversely of the supporting arm and extends through a bearing sleeve G which extends through and is secured in a transverse hole *g* in the supporting arm. Screws *g'* are shown for stationarily securing the bearing sleeve in the hole *g*. The adjusting shaft is provided with a screwthreaded portion *f* preferably near one end thereof, which works in a screwthreaded hole in one end of the bearing sleeve, and the other end portion of the shaft bears in a bearing *f'* at the other end of the bearing sleeve. This bearing is conveniently formed by a plug soldered or otherwise secured in the end of the bearing sleeve. The adjusting shaft is preferably provided at its opposite ends with knurled knobs H H′ for turning it so that it can be readily turned by either hand. These knobs can be secured on the ends of the shaft by screws $h$ or in any other suitable way, and are preferably chambered to receive the ends of the bearing sleeve G, so as to hide the projecting ends of the shaft, protect the screwthread thereof, and improve the appearance of the instrument.

I represents a lever which is suitably fulcrumed at $i$ in a chamber $i'$ in the supporting arm and has an arm which extends into the bearing sleeve G through an opening $i^2$ in the wall thereof and bears against a collar, shoulder or part $k$ formed on or fixed to the screw shaft F. An arm or part of the lever engages a block or abutment L formed on or fixed to the tube slide and arranged to move vertically in the chamber $i'$ in the supporting arm. Preferably the lever is provided with anti-friction rollers $m$ $m'$ respectively engaging the collar on the adjusting shaft and the abutment L on the tube slide, but these rollers can be dispensed with if desired. The tube slide C is supported by means of the abutment L resting on the upper end of the lever I and presses the lower end of the lever against the collar $k$ on the adjusting shaft.

When the adjusting shaft F is turned, its screwthreaded engagement with the bearing sleeve G causes it to move endwise, and when the shaft is turned in one direction the collar $k$ thereon swings the lever I in one direction and raises the tube slide. When the shaft is turned in the opposite direction it permits the opposite movement of the lever and the lowering of the tube slide.

N represents a spring which presses the tube slide downwardly, holding the abutment L upon the lever and moving the slide downwardly when the adjusting shaft is turned in the direction to permit such downward movement. This spring N, in the construction shown, is arranged in a vertical chamber $n$ in the supporting arm and bears at its upper end against the upper end of said chamber and at its lower end by means of a plunger $n'$ against a screw O, which is screwed into the tube slide C and extends therefrom through a hole $p$ in the lower portion of the supporting arm into the spring chamber. Any other spring means for holding the abutment L of the tube slide in operative engagement with the adjusting lever and for lowering the slide could be employed.

The construction described produces an exceedingly simple fine adjustment composed of the minimum number of parts, but one which is very efficient and desirable in use. The screw shaft extends transversely to opposite sides of the supporting arm so that it can be conveniently operated by either hand, and while bearings are provided for its opposite ends, these bearings are both formed in the one bearing sleeve G and can therefore be accurately alined and finished with the minimum labor and expense, a result which it is difficult to secure where separate bearings, separately mounted on the stand, are provided. This construction nevertheless permits the bearings to be widely separated, the full width of the supporting arm or more if desired, so as to allow a long range of movement of the lever I and the adjustable member operated thereby.

In order to provide positive stops for limiting the rotation of the adjusting shaft when it has been moved to the end of its travel in either direction, the knobs H H' at the opposite ends of the adjusting shaft are preferably provided with small longitudinally extending studs or projections $q$ $q'$ respectively adapted to strike coöperating studs or projections $q^2$ $q^3$ projecting outwardly from the ends of the bearing sleeve G. The coöperating studs of each pair are adapted to overlap or engage side to side for a distance somewhat less than the pitch of the screwthread of the adjusting shaft so that the studs will engage and stop the rotation of the shaft when they are brought opposite to each other by the turning of the shaft in one direction, while the stud on the knob will back away far enough to clear the coöperating stud $q^2$ or $q^3$ on the bearing sleeve when the shaft is turned substantially one revolution in the opposite direction. The coöperating studs $q$ $q^2$ and $q'$ $q^3$ thus positively stop the rotation of the shaft at predetermined points and prevent the shaft from being forcibly turned so as to jam or injure the screwthread, as would be possible if the shaft were stopped by the engagement of the flat end faces of the knob and the bearing sleeve, but they do not interfere with the free rotation of the shaft in either direction until the shaft reaches the desired limit of its movement.

I claim as my invention:

1. In a microscope, the combination with an adjustable member carrying a lens, of adjustment mechanism therefor comprising a transverse screw shaft provided at opposite ends with means for turning it, a bearing having a screwthreaded engagement with said shaft for causing the shaft to move endwise when turned, and a lever for transmitting movement from said shaft to said adjustable member, said lever being in direct engagement with fixed parts on said shaft and said adjustable member.

2. In a microscope, the combination with an adjustable member carrying a lens, of adjustment mechanism therefor comprising a transverse screw shaft and a lever for transmitting movement from said shaft to said adjustable member, and spaced bearings for said shaft at opposite sides of said lever one of which bearings has a screwthreaded engagement with the shaft for causing the shaft to move endwise when turned, said lever being directly engaged and moved by a part fixed on said shaft.

3. In a microscope, the combination with an adjustable member carrying a lens, of adjustment mechanism therefor comprising a transverse screw shaft provided with means for turning it, a device for transmitting motion from said shaft to said member, and a bearing sleeve through which said shaft extends, said sleeve having bearings for said shaft located at opposite sides of said motion transmitting device, one of which bearings has a screw-threaded engagement with the shaft for causing endwise movement of the shaft for actuating said device.

4. In a microscope, the combination with an adjustable member carrying a lens, of adjustment mechanism therefor comprising a transverse screw shaft provided with means for turning it, a lever actuated by endwise movement of said shaft for transmitting motion from said shaft to said member, a bearing sleeve through which said shaft extends and which has bearings located at opposite sides of said lever, one of said bearings having a screwthreaded engagement with said shaft for causing endwise movement of the latter, and a supporting part having a hole in which said bearing sleeve is secured.

5. In a microscope, the combination with an adjustable member carrying a lens, of adjustment mechanism therefor comprising a transverse screw shaft provided with means for turning it, a lever for transmitting motion from said shaft to said member, a bearing sleeve through which said shaft extends and which has bearings at opposite ends for the shaft, one of said bearings having a screwthreaded engagement with said shaft for causing endwise movement of the latter, and said bearing sleeve having an opening between said bearings through which said lever projects for engagement with said shaft, and a supporting part having a hole in which said bearing sleeve is secured.

6. In a microscope, the combination with a supporting member, and an adjustable member carrying a lens, of adjustment mechanism for said adjustable member comprising a screw shaft which extends transversely of said supporting member, bearings for said shaft which project from the opposite sides of said supporting member and one of which has a screwthreaded engagement with said shaft for causing endwise movement thereof when the shaft is turned, and a lever which transmits motion from said shaft to said adjustable member and is engaged by a part fixed on said shaft between said bearings.

7. In a microscope, the combination with a supporting member, and an adjustable member carrying a lens, of adjustment mechanism for said adjustable member comprising a screw shaft which extends transversely of said supporting member, bearings for said shaft which project from the opposite sides of said supporting member and one of which has a screwthreaded engagement with said shaft for causing endwise movement thereof, said bearings being connected to form a single rigid structure independently of said supporting member, and a lever which transmits motion from said shaft to said adjustable member and is engaged by a fixed part on said shaft between said bearings.

8. In a microscope, an adjustment mechanism including a rotatable and axially movable screwthreaded shaft, and stop means for limiting the rotation of said shaft comprising a movable stop which turns with the shaft and a coöperating stationary stop which said movable stop is adapted to strike when the shaft is turned in one direction, said movable stop being arranged to engage the side of said stationary stop for a distance not greater than the pitch of the screw-thread whereby said movable stop is adapted to pass by said stationary stop when the shaft is turned in the opposite direction.

9. In a microscope, an adjustment mechanism including a rotatable and axially movable screwthreaded shaft, and stop means for limiting the rotation of said shaft comprising a movable stud which extends parallel with said shaft and moves therewith, and a coöperating stationary stud which extends parallel with the shaft, said movable stud being arranged to overlap and strike one side of said stationary stud when the shaft is turned in one direction and to back away from and pass by said stationary stud when the shaft is turned in the opposite direction.

Witness my hand, this 10th day of July, 1915.

HARVEY N. OTT.

Witnesses:
 Louis M. Potter,
 Adelbert O. Potter.

Copies of this patent may be obtained for five cents each, by addressing the "Commissioner of Patents, Washington, D. C."